United States Patent [19]

Ungerboeck

[11] 3,758,863

[45] Sept. 11, 1973

[54] DEVICE FOR EQUALIZING BINARY BIPOLAR SIGNALS

[75] Inventor: Gottfried J. Ungerboeck, Adliswil, Switzerland

[73] Assignee: International Business Machines Corporation, Armonk, N.Y.

[22] Filed: Oct. 15, 1971

[21] Appl. No.: 189,578

[30] Foreign Application Priority Data

Oct. 22, 1970 Switzerland........................ 15670/70

[52] U.S. Cl...................... 325/321, 325/473, 333/28

[51] Int. Cl. .............................................. H04b 1/16

[58] Field of Search................ 325/42, 65, 321–326, 325/473–476; 333/18, 28, 70 T

[56] References Cited

UNITED STATES PATENTS

| | | | |
|---|---|---|---|
| 3,621,221 | 11/1971 | Cann | 333/18 |
| 3,611,149 | 10/1971 | Kimball | 325/323 |

*Primary Examiner*—Albert J. Mayer
*Attorney*—Roy R. Schlemmer, Jr. et al.

[57] ABSTRACT

The present invention is concerned with a circuit for equalizing binary bipolar signals, comprising transversal filter means for reducing distortions due to overlapping.

8 Claims, 9 Drawing Figures

INVENTOR
GOTTFRIED J. UNGERBOECK
BY
ATTORNEY

DEVICE FOR EQUALIZING BINARY BIPOLAR SIGNALS

BACKGROUND OF THE INVENTION

When binary signals, which were sent out as sequences of pulses of opposite polarity at a constant bit rate (fixed time interval T between successive pulses) are transmitted, distortions are generated by the addition of noise signals as well as by mutual overlapping of neighboring signal pulses due to linear distortions of the transmission channel. An equalizer in the receiver should be able to eliminate these distortions as much as possible.

Many types of equalizers for this purpose are known in the art; during recent years particularly, equalizers became known which include a matched filter for reduction of noise distortions followed by a transversal filter for decreasing the undesirable effects of signal overlapping. The transversal filters include a tapped delay line, the tap outputs of which are multiplied with a weighting coefficient by special circuitry and are then added to generate the output signal.

In most of the known equalizers of this type the tap output signals are linearly weighted. The weighting coefficients are either defined by solving a system of linear equations or, for an optimum linear filter, by solving a complicated system of no-linear equations by a method described by Aaron and Tuffs in IEEE Transactions on Information Theory, January 1966, pp. 26–34.

An optimum reduction of distortion can be achieved with linear filters only if the original signal and the received observable signal are both normally distributed. Since, however, the original binary signal has a discrete distribution of pulse amplitudes further improvement can be achieved only by non-linear filters. A non-linear equalizer is disclosed in Swiss Pat. No. 483,163. The equalizer of the Swiss patent comprises a transversal filter with non-linear amplitude limiters connected to the output taps except for the central tap. The output signal of the central tap is multiplied by two and added to the output signals of the amplitude limiters. In many cases, this equalizer offers better results than linear equalizers; it represents, however, not yet the optimum solution because of its simple construction.

SUMMARY AND OBJECTS

It is an object of the present invention to disclose an equalizer which closely approximately a theoretically optimum equalizer and which provides the possibility of determining the binary signal values with minimum error probability. The sampling values of a received signal interval should be evaluated and used for correction of the central value, not individually but together as a whole. This should be achieved as follows: The sequences of binary values most probably corresponding to the received signal interval should be found and used for determining the correction term which then depends less on the tap output signals than on the binary values actually sent.

The invention in general comprises a circuit for equalizing binary bipolar signals, comprising transversal filter means for reducing distortions due to overlapping, which is characterized in that the transversal filter means include, besides means for acquiring 2M+1 sampling values $y_i$ from an observed current interval of the input signal, means for providing reference values $s_i$ corresponding to at least part of the sampling values which are generated when a single binary value is transmitted, and further includes means for non-linear evaluation and combination of sampling values and reference values in order to generate an output signal $z = 2y_0+\kappa$, wherein corresponds to the difference of signals which are obtained in the evaluation means from sampling values and reference values and their corresponding negative values only by generating sums and by selecting maxima of these sums.

Other objects, features and advantages of the invention will be apparent from the following description of this invention.

DESCRIPTION OF THE DISCLOSED EMBODIMENTS OF THE INVENTION

Figure 1:
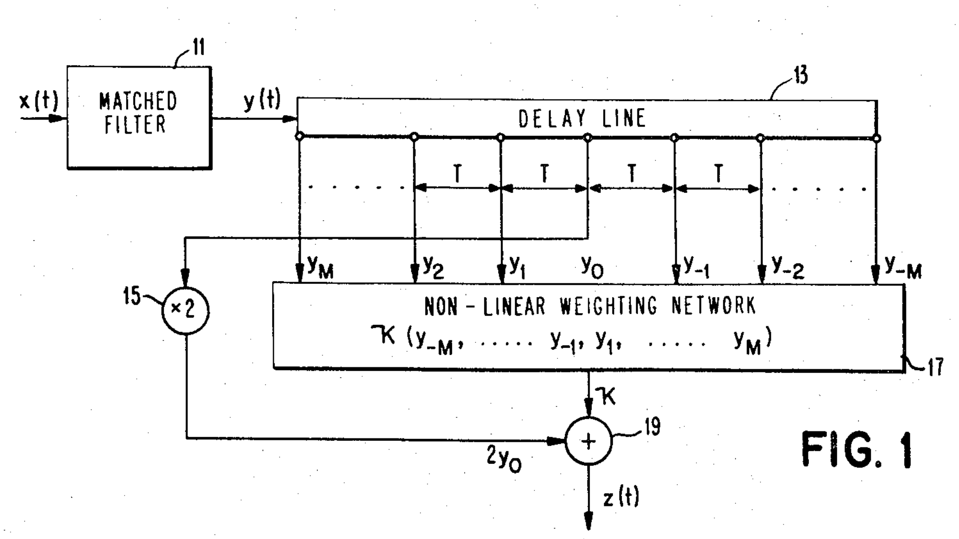
FIG. 1 comprises a schematic representation of an equalizer circuit constructed according to the invention.

FIG. 1 schematically shows broadly the structure of an equalizer constructed according to the teaching of the present invention. A sequence of binary bipolar pulses with equal time distance from each other (amplitude $a_i = \pm 1$; bit rate $f_T = 1/T$) is applied to a transmission channel. The signal $x(t)$ received from the transmission channel which is distorted by mutual overlapping of the binary signals and by additive noise initially passes through a matched filter 11 which constitutes the input of the equalizer. This filter is matched to the transmission characteristics of the channel and effects pre-equalizing of the received signal, particularly an optimum suppression of the noise. These processes will become more clear in connection with FIG. 2.

For further equalizing, particularly for the compensation of overlapping, the output signal of filter 11 is transferred to a delay line 13 including a number of taps the distance of which corresponding to a delay time of one bit interval T of the transmitted bipolar binary signal.

Signal $y_0$ from the center tap is applied to a multiplier 15 the output signal of which is $2y_0$. All the other taps for signals $y_{-M}...y_{-1}, y_1...y_M$ are connected to evaluation unit 17 which furnishes a correction signal $\kappa$ at its output. Combination of signals $2y_0$ and $\kappa$ by an adder 19 renders the output signal $z(t)$ of the equalizer. This output signal is sampled at a bit rate corresponding to the bit rate of the binary signal; the sign of the sampling value determines the binary output value.

Evaluation unit 17 effects a non-linear weighting of tap output signals $y_{-M}...y_M$ with consideration of mutual dependencies. The evaluation is termed non-linear because it comprises decision processes which select the maximum of a plurality of available terms or signals for further processing. Evaluation unit 17 and the process on which it is based comprise the essential feature of the present invention. This unit and its operation will be described later in more detail. First, however, the structure of the signals to be evaluated and the mutual overlapping are described in somewhat more detail in connection with FIGS. 2 and 4.

Figure 2A:
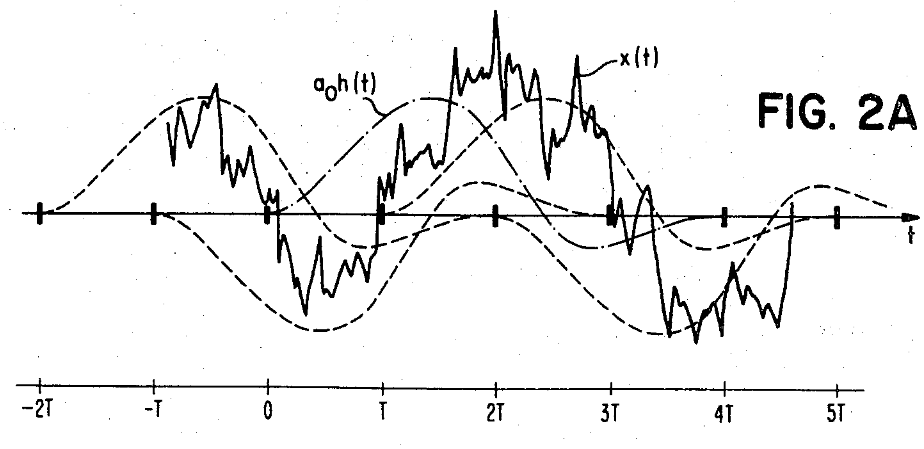
FIGS. 2A and 2B comprise waveforms illustrating a non-equalized input signal for the equalizer of FIG. 1, and an input signal partly equalized by a matched filter.

In FIG. 2A the actual input signal $x(t)$ to the equalizer is represented by the solid curve. The corresponding equation is:

$$x(t)=\sum_{i=-M}^{M} a_i h(t-iT)+w(t) \qquad (1)$$

A restriction to a finite sequence of binary values is made here, i.e., M values on each side of the currently considered binary value $a_0h(t)$ is the response of an undisturbed transmission channel to a sent binary value $a_0 = +l$. The curve for $a_0h(t)$ reveals that the deformed single pulse spreads over several bit intervals $(n \cdot T)$ which fact causes the overlapping. $w(t)$ stands for the Gaussian noise which is additively superimposed over the sum of the single pulse signals.

Figure 2B:
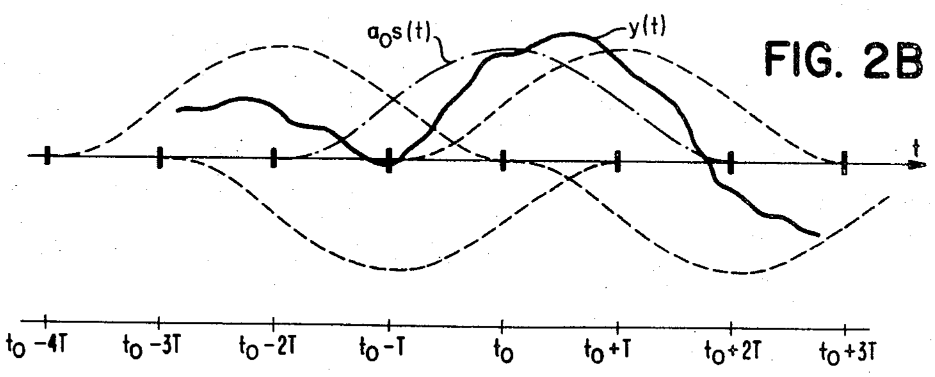

The solid curve in FIG. 2B represents the output signal $y(t)$ of the matched filter 11. This filter causes optimum noise suppression by autocorrelation. During this process, the received signals are also equalized with respect to phase, and the signals $a_ih(t-iT)$ il) transformed into signals $a_is(t-iT)$. Due to the phase equalization, $s(t)$ is a symmetric function with respect to its maximum amplitude.

The mutual overlapping of single pulses, however, still exists at the filter output and is possibly even worse than at the filter input. The output signal of the filter which must now be processed further to eliminate the effect of overlapping can be described by equation:

$$y(t)=\sum_{i=-M}^{M} a_i s(t-iT)+n(t) \qquad (2)$$

In the above equation, $n(t)$ is the remaining part of the noise. It should have no influence or a minimum of influence on the binary output value. In some prior art equalizers, however, the influence of this remaining part of the noise is even increased.

Figure 3:
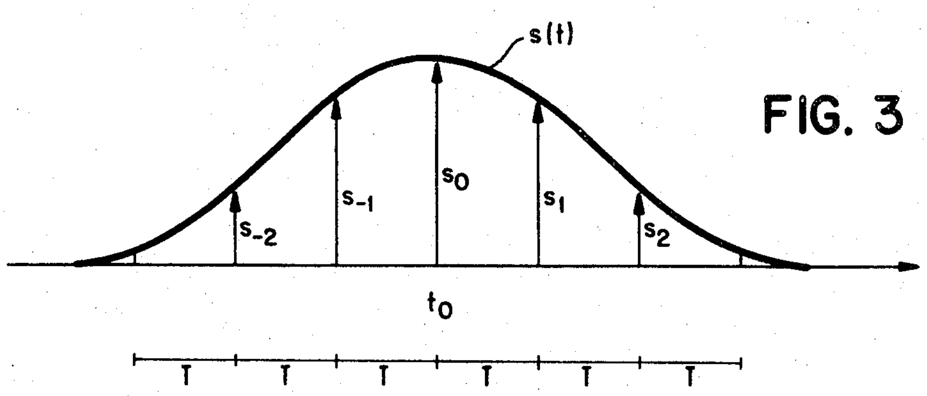
FIG. 3 comprises the waveform of a delay line filter input signal due to a single pulse representing one binary value.

$s(t)$ is the pulse response at the matched filter output for a single undisturbed binary pulse $a_0=+l$. This waveform is shown in FIG. 3. $s_{-2}$, $s_{-1}$, $s_0$... are the values of function $s(t)$ at successive sample times. These values could be acquired, for example, from the corresponding taps of the delay line 13 (FIG. 1) after receipt of a single undisturbed pulse. The values $s_i$ are an important input to the following part of the equalizing process, as is shown later on. They must be permanently available as auxiliary values from potentiometer taps or in a storage means after a single or repetitive measuring or calculating procedure. Over-shooting of the curve $s(t)$ to the negative region is well possible at the extreme ends but it is not assumed here to simplify the representation.

Figure 4:
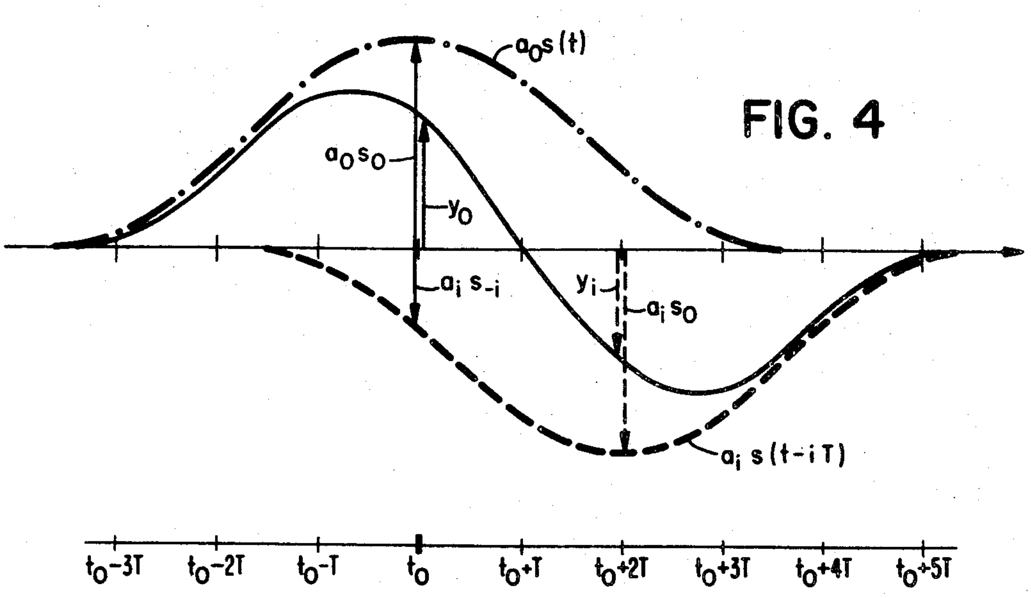
FIG. 4 comprises waveforms illustrating schematically the mutual overlapping of two binary pulses.

A much simplified representation of the mutual overlapping of two binary pulses is shown in FIG. 4. The two pulses, if independent of each other, would generate the signals $a_0s(t)$ and $a_is(t-iT)$ (broken curves). Due to overlapping, the solid curve in the middle is being generated. Therefore, at time $t_0$, instead of $a_0s_0$, the sampling value $y_0$ is obtained which differs from $a_0s_0$ by an amount $a_is_{-i}$. Consequently, the approximate value $a_is_{-i}$ has to be derived from the received and measurable value $y_i$ in order to correct the received value $y_0$ so that the value $a_0s_0$ is obtained as accurately as possible.

In most of the prior art equalizers the correction values $a_is_{-i}$ (actually, there is not only one but a number of neighboring pulses $a_i$ which overlap pulse $a_0$) are approximately obtained by separate linear or non-linear weighting of the received values $y_i$. The received values $y_i$, however, are not only dependent on the respective sending pulses $a_i$ but are also distorted by overlapping of neightboring pulses (FIG. 4 shows the influence of $a_0$ on $y_i$). Consequently, an improved correction of overlapping can be achieved if the delay line tap output signals are not weighted individually but in combination. This is accomplished by the method utilized by the present invention which will now be described.

In the following derivation of the optimum correction term, the theoretical considerations are set forth on which the present equalizer is based. Initially, in view of the received signal waveform within the interval of observation, two terms are established representing the probabilities that $a_0=+l$ or $a_0=-l$ has been transmitted within an arbitrary sequence of adjacent binary signals. Starting with the ratio of these two terms, a formula for the correction term $(y_{-M}...y_{-1}, y_1...y_M)$ is developed; an implementation of this formula would be the optimum equalizer.

The complicated expression for $\kappa$ is converted to a simpler form by approximation. To evaluate this somewhat simplified expression for $\kappa$, known methods of dynamic programming are employed; this results in recursion formulae which can easily be evaluated. Finally, circuit means are disclosed for implementing and evaluating these recursion formulae.

The derivation is based on the waveform of the received signal $x(t)$ during a considered interval I:

$$X_I=[x(t),\ t \in I] \qquad (3)$$

The following probability ratio can now be formulated:

$$\lambda=[p(X_I/a_0=+1)]/[p(X_I/a_0=-1)] \qquad (4)$$

$p(X_I/a_0=\pm1)$ are the probability density functions for the fact that with $a_0=1$ or $a_0=-1$ respectively the signal waveform $X_I$ can be received. If $\lambda > 1$, the output binary value $b_0$ which should correspond to the sent binary value $a_0$ is made +1. If $\lambda \leqq 1$, then $b_0=-1$.

To convert the expression for $\lambda$, the sum of the probability density functions $p$ for all possible sequences of binary value corresponding to the interval I is now introduced. These are sequences comprising the M binary values which precede and the M binary values which follow the considered value $a_0$. A sequence including the central value $a_0$ is designated $\vec{a}$; a sequence without $a_0$ is designated $\vec{a}'$.

$$\vec{a} = [a_{-M}, \ldots a_{-1}, \ldots a_M] \tag{5a}$$

$$\vec{a}' = [a_{-M}, \ldots a_{-1}, a_1, \ldots a_M] \tag{5b}$$

With these assumptions the following can be written:

$$\lambda = \frac{\sum_{\vec{a}'} p(X_I/a_0=+1, \vec{a}')}{\sum_{\vec{a}'} p(X_I/a_0=-1, \vec{a}')} \tag{6}$$

$$\sum_{\vec{a}'} p \ldots$$

means the sum of the values $p$ for all possible binary sequences $\vec{a}'$. $p(X_I/\vec{a})$ represents the probability density for receiving the signal wave. . form $X_I$ when the binary sequence $\vec{a}$ was sent.

For calculating $p(X_I/\vec{a})$, the signal corresponding to the sequence $\vec{a}$ is substracted from the received signal. For the remaining part of the signal, which corresponds to the Gaussian noise signal, the probability density function can be derived by a known procedure. If this assumption is made, and if the values $y_i$ and $s_i$ are known for a received signal interval, equation 6 can be converted into:

$$\lambda = \frac{\sum_{\vec{a}'} \exp\left\{\sum_{i=-M}^{M} a_i\left(y_i - \frac{1}{2}\sum_{k=-M}^{M} a_k s_{i-k}\right)\right\} a_0=+1}{\sum_{\vec{a}'} \exp\left\{\sum_{i=-M}^{M} a_i\left(y_i - \frac{1}{2}\sum_{k=-M}^{M} a_k s_{i-k}\right)\right\} a_0=-1} \tag{7}$$

It is useful to logarithmize equation 7. Insertion of the values for $a_0$, cancellation of the constant terms $$\sum_{i=-M}^{M} a_i^2 s_0$$

which are contained in all exponents, and the assumption $s_i = s_{-i}$ (because of the symmetry of signal $s(t)$) leads to the following equation:

$$ln\ (\lambda)=2y_0+(y_{-M} \ldots y_{-1}\ ,\ y_1 \ldots y_M) \tag{8}$$

in which $$\kappa = \ln \sum_{\vec{a}'} \exp\left\{\sum_{i=-M}^{M}{}' a_i(y_i - s_i) - \frac{1}{2}\sum_{i=-M}^{M}{}' \sum_{\substack{k=-M\\k\neq i}}^{M}{}' a_i a_k s_{i-k}\right\} - \ln \sum_{\vec{a}'} \exp\left\{\sum_{i=-M}^{M}{}' a_i(y_i + s_i) - \frac{1}{2}\sum_{i=-N}^{M}{}' \sum_{\substack{k=-M\\k\neq i}}^{M}{}' a_i a_k s_{i-k}\right\} \tag{9}$$

(The apostrophes at the side of the summation symbol means that the index 0 is not considered for the summation).

When equation 8 is read in connection with FIG. 1, it can be recognized that the two terms on the right side of the equation correspond to the input signals of summing unit 19. In FIG. 1, $ln\lambda$ is replaced by $z(t)$:

$$z(t) = 2y_0 + (y_{-M}, \ldots y_{-1} y_1 \ldots y_M) \tag{8a}$$

Equations 7 ... 9 correspond to the optimum non-linear equalizer. Because equation 9 is very complicated for the determination of correcting term $\kappa$ and because it would be difficult to implement this equation by circuit means, simplifications are now made.

The following description sets forth the derivation of a sub-optimum correction term. The logarithm of a sum of exponential functions is almost equal to the largest of the exponents, whereas the others can be neglected:

$$\text{Max}\ \{\xi_i\} \leq \ln\left\{\sum_{i=1}^{Z} \exp\ (\xi_i)\right\} \leq \ln\ (Z) + \text{Max}\ \{\xi_i\} \tag{10}$$

Considering this fact, equation 9 can be simplified and an approximate expression for $\kappa$ can be obtained which is much better suited for implementation:

$$\kappa \simeq \kappa_2 = \text{Max}_{\vec{a}'}\left\{\sum_{i=-M}^{M}{}' a_i(y_i - s_{-i}) - \frac{1}{2}\sum_{i=-M}^{M}{}' \sum_{\substack{k=-M\\k\neq i}}^{M}{}' a_i a_k s_{i-k}\right\} - \text{Max}_{\vec{a}'}\left\{\sum_{i=-M}^{M}{}' a_i(y_i + s_{-i}) - \frac{1}{2}\sum_{i=-M}^{M}{}' \sum_{\substack{k=-M\\k\neq i}}^{M}{}' a_i a_k s_{i-k}\right\} \tag{11}$$

The meaning of this approximate solution can be recognized by considering that the same result would have been achieved if the following had already been used instead of equation 4

$$\lambda = \frac{\text{Max}_{\vec{a}'}\ p(X_I/a_0=+1, \vec{a}')}{\text{Max}_{\vec{a}'}\ p(X_I/a_0=-1, \vec{a}')} \tag{12}$$

The approximate solution represented by equation 12 means that the most probable sequences $\vec{a}'$ are determined with $a_0 = +1$ and $a_0 = -1$ respectively, and that the ratio of their probabilities is calculated.

Finally, the binary value of output signal $b_0$ is made equal to $+1$ or $-1$ depending upon the sign of $z(t) = 2y_0 + _2$, as indicated earlier on.

The manner in which the aforementioned optimization is effected will now be set forth. The determination of correction term $\kappa_2$ according to equation 11 is an optimization problem which cannot be solved by classical methods of the calculus of variations because of the discrete character of $\vec{a}'$ ($a_i = \pm 1$). The trivial method of inserting and evaluating all possible sequences $\vec{a}$ requires considerable effort for larger values of M. The effort can be drastically reduced, however, with the aid of the dynamic programming method disclosed by R. Bellman in his book "Dynamic Programming" (Princeton University Press, 1957).

The problem is to find for each of the two bracketed terms in equation 11 the optimum sequence of values $a_i$ which renders the term to a maximum (the values of $y_i$ and $s_i$ being fixed). The principle set forth subsequently is used. If several values $a_i$ of the optimum sequence have already been determined it must be found out for one single additional value $a_i$ whether it must be +1 or −1 in order to achieve the optimum. This must be done, however, for all possible combinations of those values $a_1$ which are not yet determined, i.e., $2^n$ such evaluations must be made if after this step of the process $n$ values $a_i$ are still undetermined. For this purpose an auxiliary quantity $V_{m,n}$ is introduced which can assume two different values depending on the value $a_i$ to be selected during this step: the value $a_i$ causing the larger value V is selected as the optimum value. This means that for each decision only a maximum selection from two values has to be effected.

The subscripts of the auxiliary quantity $V_{m,n}$ indicate that the binary values of the optimum sequence which have to be determined next are the values $a_m$ and $a_n$, with the assumption that $m \leqslant 0$ and $n \geqslant 0$. Consequently, if $V_{m,n}$ has been calculated, the outer values $a_{-M}...a_{m-1}$ and $a_{n+1},...a_M$ of the optimum binary sequence are determined whereas the binary values $a_m a_{-1}$ and $a_1...a_n$ in the middle of the sequence have yet to be determined.

Consider now an example for the purpose of clarification. When a selection is made for $a_{-1}$, the values of $a_0$ and $a_1$ are assumed to be known. Also, the value of $V_{-1,1}$ is known from the decision step for $a_2$. The value of $V_{-1,1}$ is now modified in dependence of $a_0$, $a_1$ and $a_{-1}$ and is then forwarded as $V_{0,1}$ to the decision step for $a_1$.

The quantities V satisfy the following recursion formulae:

$$V_{m+i,n}=V_{m,n}+a_m\left(y_m-\sum_{k=i}^{n-m}a_{m+k}s_k\right) \qquad (13a)$$

$$V_{m,n-i}=V_{m,n}+a_n\left(y_n-\sum_{k=i}^{n-m}a_{n-k}s_k\right) \qquad (13b)$$

By recursive and alternating application of equations 13$a$ and 13$b$ and under the assumption that $V_{-M,M}=0$ and $s_i = s_{-i}$, the following expression can be obtained:

$$V_{0,0}=\sum_{i=-M}^{M}{}' a_i(y_i-a_0 s_i)-\frac{1}{2}\sum_{i=-M}^{M}{}'\sum_{\substack{k=-M\\k\neq i}}^{M}{}' a_i a_k s_{i-k} \qquad (14)$$

With is term, equation 11 can be converted into:

$$\kappa_2=\underset{\vec{a}'}{\mathrm{Max}}\,\{V_{0,0}(a_0=+1)\}-\underset{\vec{a}'}{\mathrm{Max}}\,\{V_{0,0}(a_0=-1)\} \qquad (15)$$

A recursive procedure is used to determine the two maxima of $V_{0,0}$. One commences at the end of the decision scheme under the assumption that decisions have already have been made with respect to the values of $[a_{-M+1}...a_M]$. By applying the Bellman principle the remaining values to be chosen (in this case $a_{-M}$) must be so selected that a maximum contribution to the final result of $V_{0,0}$ is achieved; i.e., that value of $a_{-M}$ causing $V_{-M+1,M}$ to be a maximum must be found (cf. equation 13$a$), assuming that $V_{-M,M}=0$. This maximum value is designated $\overline{V}_{-M+1,M}$ and is no more dependent on $a_{-M}$; it is determined for all possible sequences $[a_{-M+1}...a_{M-1}]$. Using the values of $\overline{V}_{-M+1,M}$ already calculated, $a_M$ is chosen during the next step for all possible sequences $[a_{-M+1}...a_{M-1}]$ such that $\overline{V}_{-M+1,M-1}$ is a maximum. The same steps are made for $a_{-M+1}$, $a_{M-1}$, $a_{-M+2}$, etc. Thus, $$\underset{\vec{a}'}{\mathrm{Max}}\ V_{0,0}(a_0=\pm1)=\overline{V}_{0,0}(\pm1)$$

is calculated, moving in the decision scheme from end to beginning, by applying the following recursion formulae:

$$\overline{V}_{m+1,n}(a_{m+1},\ldots a_n)=\underset{a_m}{\mathrm{Max}}\left\{V_{m,n}(a_m,\ldots a_n)+a_m\left(y_m-\sum_{k=1}^{n-m}a_{m+k}s_k\right)\right\} \qquad (16a)$$

$$\overline{V}_{m,n-1}(a_m,\ldots a_{n-1})=\underset{a_n}{\mathrm{Max}}\left\{\overline{V}_{m,n}(a_m,\ldots a_n)+a_n\left(y_n-\sum_{k=1}^{n-m}a_{n-k}s_{-k}\right)\right\} \qquad (16b)$$

This procedure is schematically represented in the following table:

| $\overline{V}_{-M,M}=0$ | Number of evaluations |
|---|---|
| $V_{-2,2}(a_{-2},a_{-1},a_0,a_1,a_2)$ | 32 |
| $\overline{V}_{-1,2}(a_{-1},a_0 a_1,a_2)$ | 16 |
| $\overline{V}_{-1,1}(a_{-1},a_0,a_1)$ | 8 |
| $\overline{V}_{0,1}(a_0,a_1)$ | 4 |
| $\overline{V}_{0,0}(a^0)$ | 2 |
| | Total $=2^{(2M+1)}-2$ |

Recursion formulae (16$a$, $b$) must be applied $(2^{(2M+1)}-2)$ times until the required values $\overline{V}_{0,0}$ are found. The evaluation effort, however, is much less than it would be for the trivial method of inserting all possible $(2^{2M+1})$ sequences $\vec{a}$ into equation 14 with subsequent evaluation.

The necessary number of operations can be further drastically reduced if the overlapping L on each side of the binary signals stretches over less than 2M basic time intervals (bit intervals) : L < 2M. This condition is satisfied in most practical cases because M should be chosen larger than L in order to obtain an evaluation interval larger than the area of overlapping. An examination of equations (16$a$, $b$) reveals that, for $n$-$m$ + 1 $\geqslant$ L, the quantities $\overline{V}_{m,n}$ can be split up into two terms, $$\overline{V}_{m,n}=\overline{V}_{m,+}+\overline{V}_{-,n}\ ,\ n-m+1\geqslant L, \qquad (17)$$

which can be expressed by the following recursion formulae:

$$\overline{V}_{m+i,+}(a_{m+i},\ldots a_{m+L})=\underset{a_m}{\mathrm{Max}}\left\{\overline{V}_{m,+}(a_m,\ldots a_{m+L-i})+a_m\left(y_m-\sum_{k=i}^{L}a_{m+k}s_k\right)\right\} \qquad (18a)$$

$$\overline{V}_{-,n-i}(a_{n-L},\ldots a_{n-i})=\underset{a_n}{\mathrm{Max}}\left\{\overline{V}_{-,n}(a_{n-L+i},\ldots a_n)+a_n\left(y_n-\sum_{k=i}^{L}a_{n-k}s_{-k}\right)\right\} \qquad (18b)$$

One can now start the optimization at the lower and upper ends of the sequence $[a_{-M} \ldots a_M]$ separately and calculate the quantities $\overline{V}_{m,+}$ and $\overline{V}_{-,n}$ by applying equations 18*a*, *b*, beginning with $\overline{V}_{-M,+}=0$ and $\overline{V}_{-M}=0$. The optimization can be continued in separate branches until $n-m+1=L$. At this point, $\overline{V}_{m,+}$ and $\overline{V}_{-,n}$ must be combined in order to obtain $\overline{V}_{m,n}$ according to equation 17. During subsequent steps equations 16*a*, *b* are used to obtain $\overline{V}_{0,0}(a_0)$. The following two tables show the optimization schemes for M = 2, L = 1 and M = 3, L = 2, respectively. These tables make it obvious how much the effort can be reduced by splitting up the evaluation. The two examples correspond to the embodiments of FIGS. 6 and 7 which are explained later on.

M = 2, L = 1: (corresponding to FIG. 6)

| | | Number of Evaluations |
|---|---|---|
| $\overline{V}_{-2,+}=0$ | $\overline{V}_{-}=0$ | |
| $\overline{V}_{-1,+}(a_{-1})$ | $\overline{V}_{-,1}(a_1)$ | 2 * 2 |
| $\overline{V}_{0,+}(a_0)$ | $\overline{V}_{-,0}(a_0)$ | 2 * 2 |
| $\overline{V}_{0,0}(a_0)=\overline{V}_{0,+}+\overline{V}_{-,0}$ | | |
| | | Total = 8 |

Figure 7:
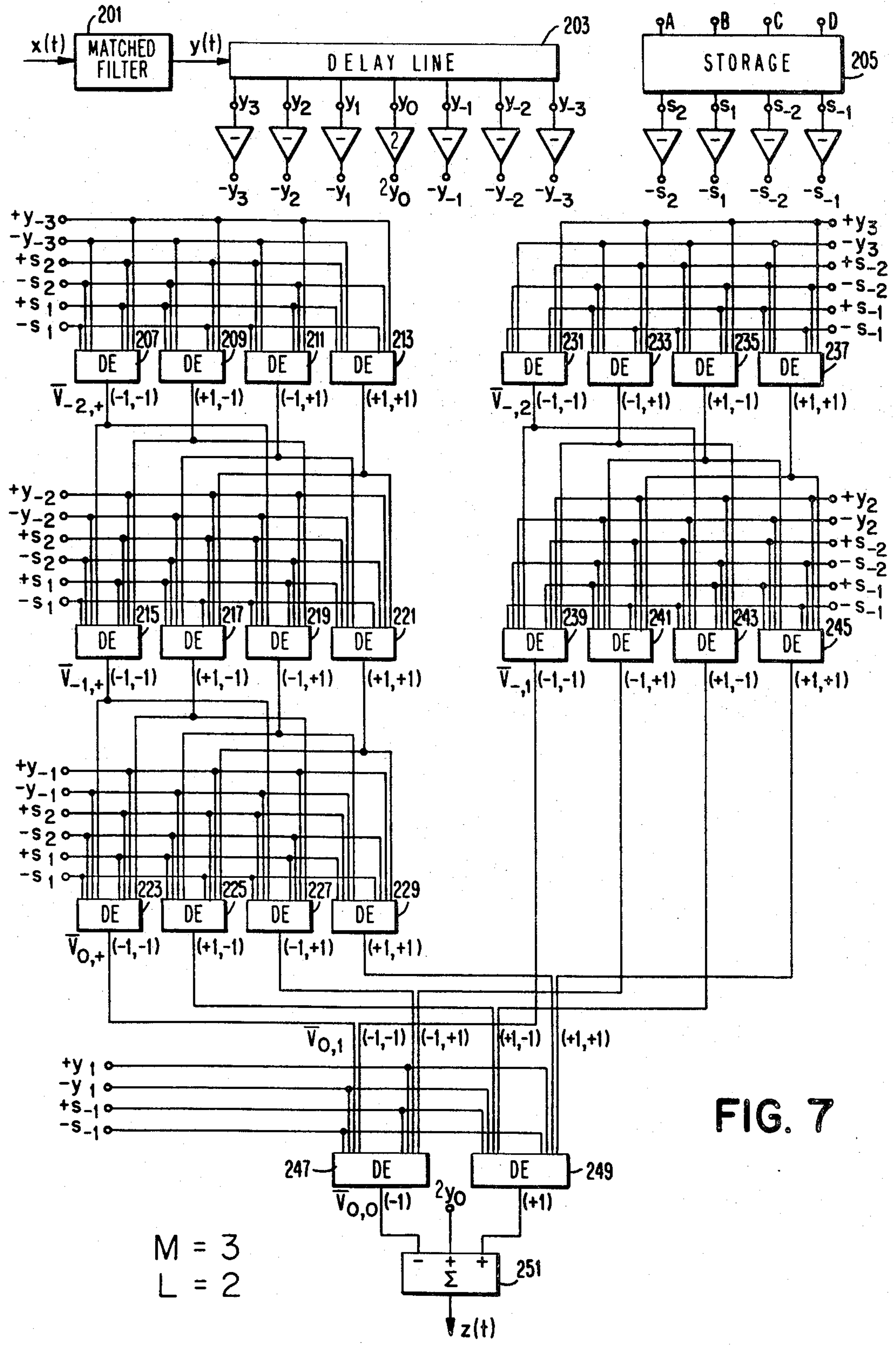
FIG. 7 comprises a block diagram of a second embodiment of an equalizer constructed according to the invention.

M = 3, L = 2 (corresponding to FIG. 7)

| | | |
|---|---|---|
| $\overline{V}_{-3,+}=0$ | $\overline{V}_{-,3}=0$ | |
| $\overline{V}_{-2,+}(a_{-2},a_{-1})$ | $\overline{V}_{-,2}(a_1,a_2)$ | 2 * 4 |
| $\overline{V}_{-1,+}(a_{-1},a_0)$ | $\overline{V}_{-,1}(a_0,a_1)$ | 2 * 4 |
| $\overline{V}_{0,+}(a_0,a_1)$ | | 4 |
| $\overline{V}_{0,1}(a_0,a_1)=\overline{V}_{0,+}+\overline{V}_{-,1}$ | | |
| $\overline{V}_{0,0}(a_0)$ | | 2 |
| | | Total = 22 |

Having thus exhaustively explained the theory of the present invention in terms of how the correction term signal is optimally generated, there will follow a description of a hardware implementation of the invention. Recursion formulae 16*a*, *b* and 18*a*, *b* are to be realized in hardware for an equalizer which generates the correction term $\kappa$ according to the method described above. These formulae require — as is shown later on in more detail with the aid of an example — that two sums be formed from various quantities and that the larger of these sums be selected. This task can be executed by a decision element schematically shown in FIG. 5A which performs the following function:

$$u_a = \text{Max}\ (\Sigma\ u_{e1}, \Sigma\ u_{e2}) \tag{19}$$

Addends of the two sums are represented by groups of input voltages $u_{e1}$ and $u_{e2}$ and the result, i.e., the maximum of the two sums, is represented by output voltage $u_a$.

Figure 5A:
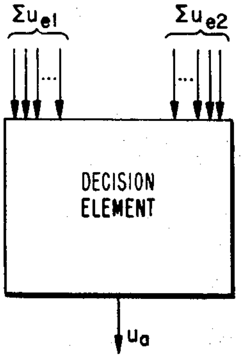
FIG. 5A comprises a block representation of the decision element used in the equalizers of FIG. 6 and FIG. 7.
Figure 5B:
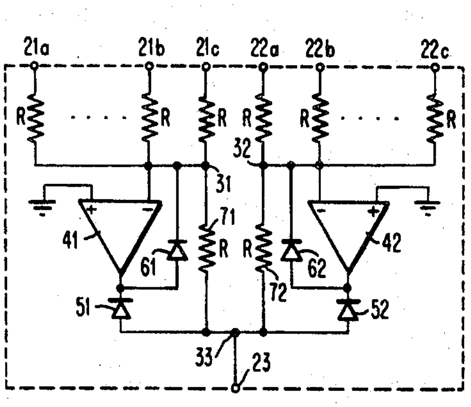
FIG. 5B comprises a schematic diagram of the circuit details of one embodiment of the decision elements of FIG. 5A.

Details of circuitry which could be used for the decision element are shown in FIG. 5B. Each of the inputs 21*a* ...21*c* of the first group is connected to summing point 31 by a resistor R. Inputs 22*a*...22*c* are connected to summing point 32 by resistors R in the same manner. Summing points 31, 32 are each connected to the input of an operational amplifier 41, 42. Outputs of these two operational amplifiers are each connected by a diode 51, 52 to junction 33 which in turn is connected to the common output 23. Summing points 31, 32 are also connected each by a diode 61, 62 to the output of the corresponding amplifier 41, 42 and by a resistor 71, 72 to the common junction 33.

This circuit operates as follows: Each half of the circuit represents per se an inverting half-wave rectifier. Due to the connection of the two outputs only the smaller of the two inverted sums is preserved. Consequently, of the two sums of input voltages the larger one is available at the output of the circuit of FIG. 5B but the polarity is inverted. At the amplifier with the larger sum of voltages at its input (e.g., 41), the parallel diode 61 is closed whereas a compensating current can flow through the other diode 51. Consequently, the sums of input currents $i_{e1}$ is flowing through the resistor 71 between summing point 31 and common output 33/23; the voltage at the latter is, therefore, equal to the inverted sum of the input voltages of the respective group. At the other amplifier (i.e., 42) the diode 52 between output and summing point is closed whereas a compensating current can flow through the parallel diode 62. A partial input to this branch is the sum of input currents $i_{e2}$ of the respective group; therefore, the voltage at the common output 23/33 is independent of the input voltages of this second group.

The circuit of FIG. 5B furnishes a voltage $-u_a$ at its output and must be completed by an inverter at the output for obtaining the decision element of FIG. 5A. In the embodiments shown in FIGS. 6 and 7 the decision elements correspond to FIG. 5A and, therefore, perform the function of equation 19. In principle, decision elements without inverters, as shown in FIG. 5B, could also be used. In this case, however, the polarities of the four diodes as well as of the input signals $y$ and $s$ must be reversed in each second stage.

Figure 6:
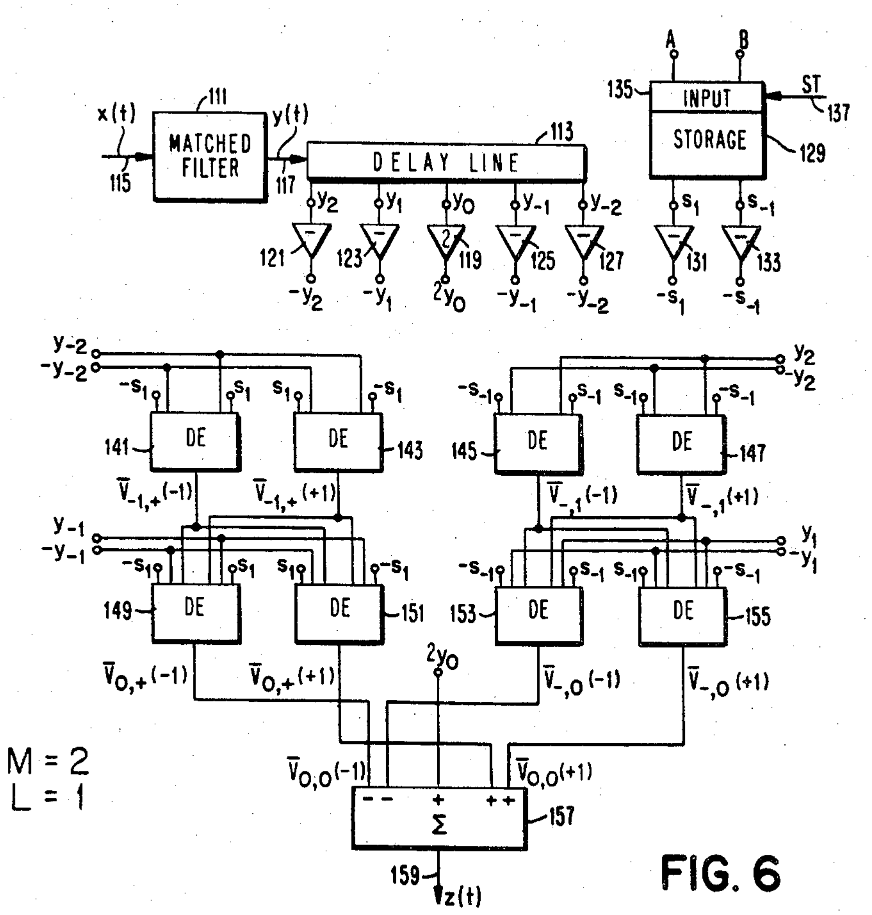
FIG. 6 comprises a block diagram of a first embodiment of an equalizer constructed according to the invention.

Analog to the multiple sequential application of the recursion formulae 16*a*, *b* and 18*a*, *b*, each time with different values for the quantities to obtain a final result, several decision elements of the type just described must be interconnected in a cascaded manner, a different combination of input signals being applied to each element. Two such embodiments are shown in FIGS. 6 and 7.

Prior to the description of these two embodiments, a brief explanation is given of a single selection operation performed by a decision element. It is assumed that the level is reached where the two values $\overline{V}$, which are dependent on the binary value $a_{-2}$ (i.e., m = −2), have to be determined. The grade of overlapping is given as L = 2. Equation 18*a* now assumes the following form:

$$\overline{V}_{-1,+}(a_1, a_0)=\underset{a_2}{\text{Max}}\ \{\overline{V}_{-2,+}(a_{-2}, a_{-1}) + a_{-2}(y_{-2}-a_{-1}s_1-a_0 s_2)\} \tag{20a}$$

The value of $\overline{V}_{-1,+}$ is not only dependent on $a_{-2}$ but also on $a_{-1}$ and $a_0$. Because the values of the latter two are unknown, four evaluations have to be made in this stage, i.e., four decision elements must be provided. For one of these elements the assumption is made that e.g., $a_{-1}=-1$ and $a_0=+1$. With $$\overline{V}_{-1,+}(-1, +1)=\underset{a_{-2}}{\text{Max}}\ \{\overline{V}_{-2,+}(a_{-2}, -1) + a_{-2}(y_{-2}+s_1-s_2)\} \tag{20b}$$

Inserting first the value +1 and then the value −1 for the binary quantity $a_{-2}$ leads to the following:

$$\overline{V}_{-1,+}(-1,+1) = \text{Max}\ [\{\overline{V}_{-2,+}(+1,-1) + y_{-2}+s_1-s_2\}, \{\overline{V}_{-2,+}(-1,-1) -y_{-2}-s_1+s_2\}] \tag{20c}$$

Decision element 219 in FIG. 7 corresponds exactly to this equation. The input voltages represent two values $\overline{V}$ and some selected $y$ and $s$ values; at the output a new value $\nabla$ is available for further processing in two subsequent decision elements.

DESCRIPTION OF THE EMBODIMENT OF FIG. 6 WHEREIN M = 2, L = 1

FIG. 6 represents an equalizer for an evaluation interval of four bit periods (4T; M = 2) and an overlapping of two bit periods (L = 1). Its input is the matched filter 111 connected to tapped delay line 113. Lines 115 and 117 carry signals $x(t)$ and $y(t)$, as shown in FIGS. 2A and 2B. An amplifier 119 is connected to center tap $y_0$ and furnishes the output voltage $2y_0$. Inverters 121, 123, 125 and 127 are connected to the other taps so that the tap output voltages $y_i$ are also available as inverted signals $-y_i$. A storage 129 is provided for the values of $s_1$ and $s_{-1}$. Inverters 131 and 133 connected to the storage outputs also furnish these voltages with inverted polarity. The storage is loaded from inputs A and B by input circuit 135 when a control signal ST is applied on control line 137. Inputs A and B can be connected to output taps $y_1$ and $y_{-1}$; in this case, control pulse ST is applied when the maximum of a single test pulse has reached tap $y_0$. Storage 129 can also be loaded, however, from another storage or from a computing unit.

The evaluation network is shown in the lower part of FIG. 6. Connecting lines are provided between outputs of the upper part and inputs of the lower part carrying the same designations; however, these lines are not shown in the drawing for simplicity reasons (the same applies to FIG. 7).

The values of $\nabla_{-1,+}$ for $a_{-2} = \pm 1$ are generated in decision elements 141 and 143. According to formula 18*a* only the values of $\pm s_1$ and $\pm y_2$ are required as input. No input is necessary for the initial value of $\nabla$ ($\nabla_{-M,0}$) because it is assumed to be 0. The same applies analogously to decision elements 145 and 147. The next stage includes decision elements 149, 151, 153 and 155; besides two signals for $\pm s_1$ and $\pm y_{-1}$ (or $\pm s_{-1}$ and $\pm y_1$ respectively), one signal is applied for a quantity $\nabla_{0,+}$ (or $\nabla_{-,0}$ respectively) available from the decision elements of the preceding stage. The association of signals to the decision elements is made in accordance with equations 18*a* or 18*b*, respectively.

Signals $\nabla_{0,+}(-1)$ and $\nabla_{-,0}(-1)$ are added to obtain $\nabla_{0,0}(-1)$; signals $\nabla_{0,-}(+1)$ and $\nabla_{-,0}(+1)$ are added to obtain $\nabla_{0,0}(+1)$. For generating $\kappa_2$, $\nabla_{0,0}(-1)$ is substracted from $\nabla_{0,0}(+1)$ according to equation 13. Finally, $\kappa_2$ and $2y_0$ are added. For all of the last mentioned adding and substracting operations one single summing circuit 157 is provided in FIG. 6. Consequently, no separate signal for the correction term is found in FIG. 6. Signal $z(t)$ appearing on output 159 is sampled with a frequency corresponding to the bit rate; its sign determines whether the final output, which corresponds to the received signal value $y_0$, is +1 or −1.

The embodiment of FIG. 7 essentially corresponds to one just described, except that now M = 3 and L = 2. Consequently, the delay line 203 connected to filter 201 has seven output taps for signals $y_3 \ldots y_{-3}$. Storage 205 is provided to accept four values for $s_2$, $s_1$, $s_{-1}$ and $s_{-2}$ at its inputs A, B, C and D. All $y$ values (except $y_0$) and all $s$ values are also available with inverted signal via appropriate inverters shown but not numbered.

Decision elements 207...245 are connected to each other, to the outputs of delay line 203 and storage 205, and to the outputs of the inverters in accordance with equations 18*a* and 18*b*. Since two $s$ values ($\pm s_2$, $\pm s_1$ or $\pm s_{-1}$, $\pm s_{-2}$) are required for each input group due to the extended overlapping, each decision element has two inputs more than in FIG. 6, and in each stage twice the number of elements are required.

In contrast to FIG. 6, combination of the left and right halves is not achieved here by adding $\nabla_{0,+}$ and $\nabla_{-,0}$ to obtain $\nabla_{0,0}$; instead, $V_{0,1}$ is obtained by adding $\nabla_{0,+}$ and $\nabla_{-,1}$. Four decision elements can thus be saved. However, a further stage consisting of two decision elements is required for evaluating the four values of $\nabla_{0,1}$ to obtain two values for for $\nabla_{0,0}$. The subtracting operation $\nabla_{0,0}(+1) - \nabla_{0,0}(-1)$ for obtaining $\kappa_2$, and the addition of $\kappa_2$ and $2y_0$ to obtain $z(t)$ are in this case also combined in summing circuit 251. Finally, signal $z(t)$ is evaluated as described above.

Instead of the cascaded structure shown in FIG. 6 and FIG. 7, only one group of decision elements could be provided as well, using it several times and each time with different input values so that the evaluations would be effected sequentially and not simultaneously. Thus a major part of the decision elements could be saved; however, a sequencing control and intermediate storage for the intermediate results would be required in this case.

The disclosed decision networks for non-linear weighting of the delay line tap output signals in an equalizer for bipolar binary signals are well suited for integrated circuit technology because the individual elements show a relatively simple design and are all identical.

The somewhat higher circuit expenditure in comparison to known equalizers of similar basic design is justified in many cases because of the higher probability that received messages are error-free, e.g., in satellite and space communications.

An important advantage of the present invention is the readiness of the equalizer for immediate operation. The frequently used adaptive equalizers often require several seconds for the adaption process, this time delay is not acceptable in e.g., data transmission between data processing systems which often lasts only a few milliseconds. A further advantage in comparison to linear equalizers is the fact that the remaining part of the noise signal still existing at the output of the entrance filter is not intensified by the delay line filter unit.

While the invention has been particularly shown and described with reference to preferred embodiments thereof, it will be understood by those skilled in the art that various changes in form and details may be made therein without departing from the spirit and scope of the invention.

What is claimed is:

1. A device for equalizing distortion and errors due to overlapping binary bipolar signals, comprising transversal filter means wherein said transversal filter means include, a delay line having 2M+1 tap points, wherein M is an integer, means for obtaining from said 2M+1 tap points 2M+1 sampling values $y_i$ at a predetermined sampling interval of the input signal, said tap points and consequently said sampling values being displaced from each other one bit width, means for generating reference values $s_i$ corresponding to at least part of the sampling values which are generated when a single binary value is transmitted, means for non-linearly combining said sampling values and reference values in order to generate an output signal $z = 2y_0 +$ , wherein $y_0$ is the sampling value obtained from the mid-tap point on said delay line and corresponds to the difference of signals which are obtained in the combining means utilizing the sampling values and reference values and their corresponding inverted values wherein only the operations of addition and the selection of maxima are effected in the generation of said value.

2. An equalization device as set forth in claim 1 wherein said combining means includes a plurality of decision elements (141...155, FIG. 6; 207...249, FIG. 7) each of which generates two sum signals from input signals applied to it in two groups of inputs and delivers an output signal ($\overline{V}$) corresponding to the larger of the two sum signals, and that the decision elements are arranged in blocks, each block containing at least one decision element and interconnected in a cascaded manner.

3. An equalization device as set forth in claim 2 wherein said decision elements in each of the two input groups include means for connecting the output signal ($\overline{V}$) of a decision element from a preceding block to at least one input of a succeeding decision element, one signal selected from the group $y_i$ and $-y_i$ to another input, and one signal selected from the group comprising $s_i$ and $-s_i$ to the remaining inputs, the signals $y_i$ and $s_i$ of one input group being inverted with respect to those of the other input group of the same decision element; and at least one summing circuit (156, FIG. 6; 251, FIG. 7) for combining the output signals ($\overline{V}_{0,0}$; $\overline{V}_{0,+}$, $\overline{V}_{-,0}$) from the last block of decision elements with a signal $2y_0$ connected to the outputs of said last block of decision elements to produce an output signal $z$.

4. An equalization device as set forth in claim 3 including means in one block of decision elements (247, 249; FIG. 7) for applying the output signal ($\overline{V}_{m,+}$, $\overline{V}_{-,n}$) of a decision element of the preceding block to each of two inputs of each input group so that in this block in each input group, the sum ($\overline{V}_{m,n}$) of two decision element output signals is used.

5. An equalization device as set forth in claim 1 wherein said evaluation means (141...157, FIG. 6) includes means for computing the correction term in accordance with the equation $$\kappa \simeq \kappa = \underset{\vec{a}'}{\text{Max}} \left\{ \sum_{i=-M}^{M}{}' a_i (y_i - s_i) - \frac{1}{2} \sum_{i=-M}^{M}{}' \sum_{\substack{k=-M \\ k \neq i}}^{M}{}' a_i a_k s_{i-k} \right\} - \underset{\vec{a}'}{\text{Max}} \left\{ \sum_{i=-M}^{M}{}' a_i (y_i + s_{-i}) - \frac{1}{2} \sum_{i=-M}^{M}{}' \sum_{\substack{k=-M \\ k \neq i}}^{M}{}' a_i a_k s_{i-k} \right\}$$

where $a_i$ represents a binary value +1 or −1 and $\vec{a}'$ represents a sequence of binary values $a_{-M}$, ...$a_{-1}$, $a_1$...$a_M$, where $\Sigma'$ has the meaning that the subscript value $i$—0 is not considered in the summation.

6. An equalization device as set forth in claim 1 wherein said evaluation and combination means includes decision units (141...155, FIG. 6; 207...249, FIG. 7) including means for generating signals V, for obtaining the optimum value of $\kappa$ from said sampling and reference signals $y_i$ and $s_i$, such that each decision unit satisfies the equations $$\overline{V}_{m+1,n}(a_{m+1}, \ldots a_n) = \underset{a_m}{\text{Max}} \left\{ \overline{V}_{m,n}(a_m, \ldots a_n) + a_m \left( y_m - \sum_{k=1}^{n-m} a_{m+k} s_k \right) \right\}$$

$$\overline{V}_{m,n-1}(a_m, \ldots a_{n-1}) = \underset{a_n}{\text{Max}} \left\{ \overline{V}_{m,n}(a_m, \ldots a_2) + a_n \left( y_n - \sum_{k=1}^{n-m} a_{n-k} s_{-k} \right) \right\}$$

for each decision unit one of the binary quantities $a_i$ is equal to +1 for one set of inputs, and is equal to −1 for the other set of inputs, whereas all other quantities $a_i$ are fixed;

the value of L corresponds to the extent of intersymbol interference on one side;

at least one adder-subtracter circuit (159, FIG. 6; 251, FIG. 7) connected to the outputs of the decision units for combining the signals $\overline{V}_{0,0}$, or $\overline{V}_{0,+}$ and $V_{-,0}$, respectively, from the decision units of said last generation means.

7. An equalization device as set forth in claim 6 wherein means for interconnecting succeeding decision units are provided so that in the transition from an evaluation stage in which the decision units generate intermediate signals of the type $\overline{V}_{m,+}$ or $\overline{V}_{-,n}$ to an evaluation stage in which the decision units generate intermediate signals of the type $\overline{V}_{m,n}$, an addition of the intermediate signals corresponding to equal sequences of binary quantities $a_i$ is effected by the interconnection means according to the relation $\overline{V}_{m,n} = \overline{V}_{m,+} + \overline{V}_{-,n}$.

8. An equalization device as set forth in claim 1 wherein said evaluation and combination means includes decision units (141...155, FIG. 6; 207...249, FIG. 7) including means for generating signals $\overline{V}$, for obtaining the optimum value of $\kappa$ from said sampling and reference signals $y_i$ and $s_i$, such that each decision unit satisfies the equations $$\overline{V}_{m+1,+}(a_{m+1}, \ldots a_{m+L}) = \underset{a_m}{\text{Max}} \left\{ \overline{V}_{m,+}(a_m, \ldots a_{m+L-1}) + a_m \left( y_m - \sum_{k=1}^{L} a_{m+k} s_k \right) \right\}$$

$$\overline{V}_{-,n-1}(a_{n-L}, \ldots a_{m-1}) = \underset{a_n}{\text{Max}} \left\{ \overline{V}_{-,n}(a_{n-L+1}, \ldots a_n) + a_n \left( y_n - \sum_{k=1}^{L} a_{n-k} s_k \right) \right\}$$

for each decision unit one of the binary quantities $a_i$ is equal to +1 for one set of inputs, and is equal to −1 for the other set of inputs, whereas all other quantities $a_i$ are fixed;

the value of L corresponds to the extent of intersymbol interference on one side;

at least one adder-subtracter circuit (159, FIG. 6; 251, FIG. 7) connected to the outputs of the decision units for combining the signals $\overline{V}_{0,0}$, or $\overline{V}_{0,+}$ and $V_{-,0}$, respectively, from the decision units of said last generation means.

* * * * *